(12) United States Patent
Bender (10) Patent No.: US 6,190,109 B1
(45) Date of Patent: *Feb. 20, 2001

(54) RESTRAINING MEMBER WITH RECESSED SHANK FOR A VEHICLE RESTRAINT

(75) Inventor: Brian D. Bender, Racine, WI (US)

(73) Assignee: Rite-Hite Holding Company, Milwaukee, WI (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/090,444

(22) Filed: Jun. 4, 1998

(51) Int. Cl.[7] ................................................ B65G 69/00
(52) U.S. Cl. ............................................ 414/401; 414/396
(58) Field of Search .......................... 29/401.1; 414/401, 414/402, 39.6, 584

(56) References Cited

U.S. PATENT DOCUMENTS

| | | | |
|---|---|---|---|
| 4,264,259 | * 4/1981 | Hipp ..................................... | 414/401 |
| 4,379,354 | 4/1983 | Hahn et al . | |
| 4,400,127 | 8/1983 | Metz . | |
| 4,472,099 | 9/1984 | Hahn et al. . | |
| 4,488,325 | 12/1984 | Bennett et al. . | |
| 4,555,211 | 11/1985 | Metz . | |
| 4,648,781 | 3/1987 | Sikora . | |
| 4,664,582 | 5/1987 | Edmeads . | |
| 4,695,216 | 9/1987 | Erlandsson . | |
| 4,759,678 | 7/1988 | Hageman . | |
| 4,767,254 | 8/1988 | Kovach et al. . | |
| 4,784,567 | 11/1988 | Hageman et al. . | |
| 4,815,918 | 3/1989 | Bennett et al. . | |
| 4,861,217 | 8/1989 | Erlandsson . | |
| 4,938,647 | 7/1990 | Erlandsson . | |
| 4,964,777 | 10/1990 | Kleynjans et al. . | |
| 4,973,213 | 11/1990 | Erlandsson . | |
| 5,026,242 | * 6/1991 | Alexander ............................ | 414/401 |
| 5,120,181 | 6/1992 | Alexander . | |
| 5,203,663 | 4/1993 | Ruppe . | |
| 5,297,921 | * 3/1994 | Springer et al. ...................... | 414/401 |
| 5,336,033 | 8/1994 | Alexander . | |
| 5,346,353 | * 9/1994 | Alexander ............................ | 414/401 |
| 5,348,437 | 9/1994 | Krupke et al. . | |
| 5,388,947 | * 2/1995 | Ancel et al. ......................... | 414/401 |
| 5,505,575 | * 4/1996 | Alexander ............................ | 414/401 |
| 5,683,219 | * 11/1997 | Gilles, Jr. et al. ................... | 414/401 |
| 5,882,167 | * 3/1999 | Hahn et al. .......................... | 414/401 |

* cited by examiner

Primary Examiner—Steven A. Bratlie
(74) Attorney, Agent, or Firm—Marshall, O'Toole, Gerstein, Murray & Borun (57) ABSTRACT

A restraining member for use with a vehicle restraint for releasably securing a parked vehicle to an adjacent structure is disclosed. The restraining member is pivotally mountable to the vehicle restraint, and is shiftable between a retracted position in which the restraining member is disposed within the recess, and an extended position in which the restraining member is positioned to engage the ICC bar of a parked vehicle. The restraining member comprises a base pivotally mounted to the carriage, a crown, and an offset shank interconnecting the base and the crown. The crown, the shank, and the base each have inner edges, which cooperate to define an open, substantially tetragonally shaped, area sized to receive the ICC bar. The crown and the shank define an engagement portion which is adapted to receive and engage a wide variety of ICC bar sizes.

21 Claims, 10 Drawing Sheets

RESTRAINING MEMBER WITH RECESSED SHANK FOR A VEHICLE RESTRAINT

FIELD OF THE INVENTION

The present invention relates to vehicle restraints for securing vehicles parked adjacent to a structure, such as a loading dock. More specifically, the present invention relates to a restraining member having a recessed throat and a capture portion which enable the restraining member to secure a wide variety of vehicles yet permit the restraining member to retract fully within the body of the vehicle restraint.

BACKGROUND OF THE INVENTION

Most accidents that occur in and around loading docks are attributable to human error. These accidents can result in serious injury, especially when power material handling equipment is used. Often these accidents are the result of a failure to properly secure the parked truck in place, coupled with an inattentive driver who prematurely drives away while workers and/or equipment are still engaged in the loading or unloading operations. In addition to premature departure, other circumstances can lead to undesired separation of the trailer from the dock, such as trailer creep or landing gear collapse. Accordingly, vehicle restraint devices were developed.

Vehicle restraint devices are generally well known in the art, and are routinely employed in order to effectively secure a vehicle to an adjacent loading dock during loading and unloading operations. Although the design, cost and effectiveness of existing vehicle restraints differs widely, if properly designed, such restraint devices can help reduce the number of serious injuries resulting from human error in the loading dock environment.

Figure 1:
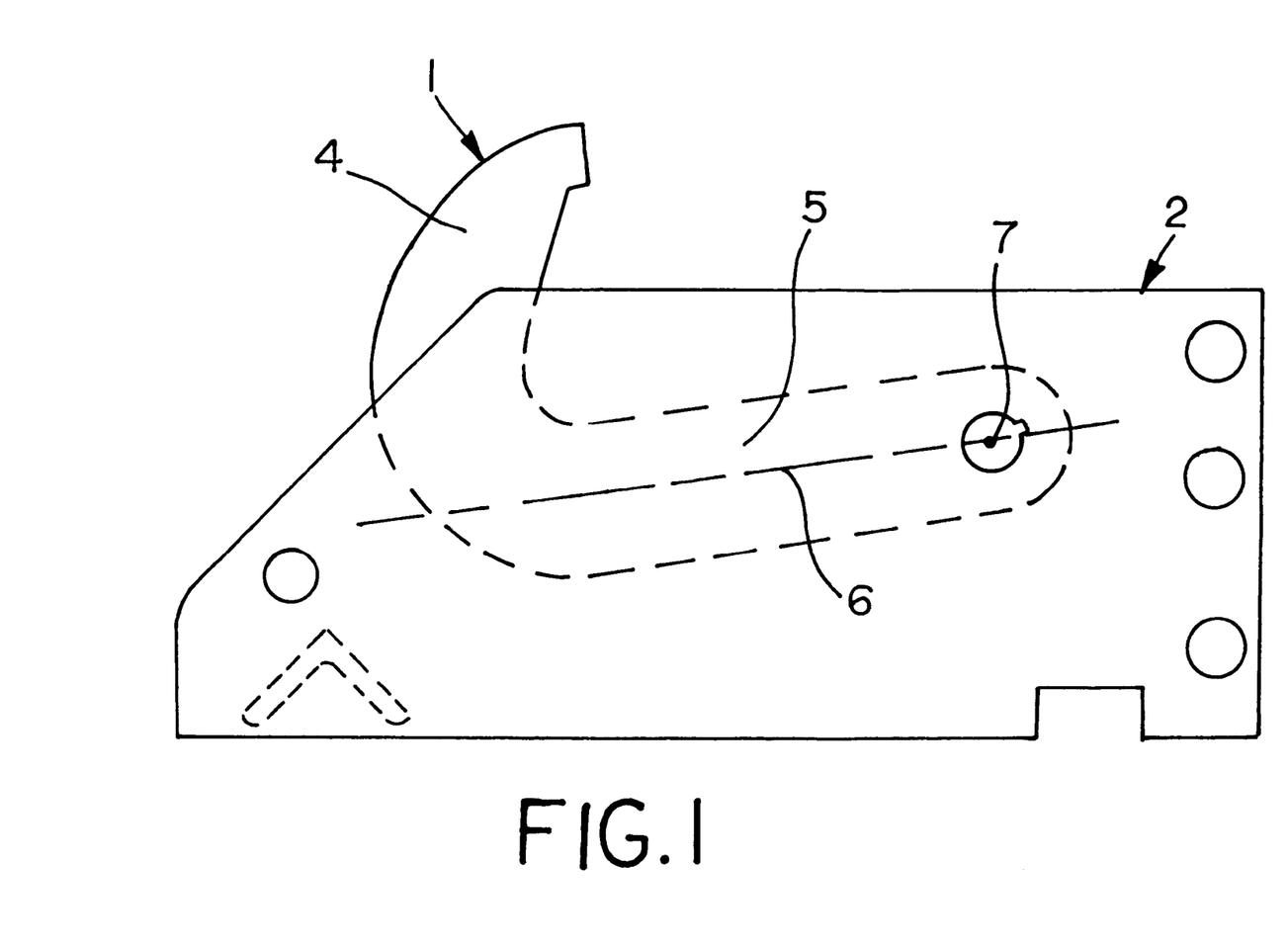
FIG. 1 is a fragmentary elevational view of a prior art hook disposed within a carriage.

One such vehicle restraint device employs a rotating hook which engages the ICC bar (also called a Rear Impact Guard or RIG) on the rear of the truck. As shown in FIG. 1, the hook 1 of this type of prior art vehicle restraint is typically mounted in a carriage 2 which is slidably mounted to the dock structure and which automatically adjusts to the height of the RIG as a vehicle approaches the structure. A motor (not shown) rotates the hook 1 from a retracted position to an engaged position in which the hook 1 engages or captures the RIG. The typical hook 1 consists of a crown 4 and a shank 5, with the shank 5 having a longitudinal axis 6 which intersects the pivot point 7 of the hook 1. Such a conventional design limits the hook 1 to a simple, rotational movement about the pivot point 7. Examples of such rotating hook vehicle restraint devices can be found in U.S. Pat. Nos. 4,264,259 and 4,379,354. Vehicle restraint devices of the rotating hook variety are generally viewed as the most effective approach to preventing certain loading dock accidents, such as unscheduled departure, trailer creep, landing gear collapse, or trailer upending.

The size and strength of the RIG is subject to regulation by the National Highway Traffic Safety Administration (NHTSA). Recently, the NHTSA has issued new regulations increasing the strength requirements for the RIGs installed on newly manufactured vehicles. One way to achieve the new strength requirements, although not required under the rule, is to increase the cross-sectional dimensions of the RIG, for example, by increasing the vertical dimension. Unfortunately, the existing hooks on many vehicle restraint devices (of both the rotating hook design and other varieties) were not designed for these taller (up to 6") RIGs. In the case of rotating hook restraints, these taller RIGs may, in certain limited circumstances, render existing hooks incapable of achieving the functionally advantageous "two-point contact" trap when the existing hooks are used with the new taller RIGs. Although the dimensions of the hook could be increased in order to obtain the "two-point contact" trap for a taller RIG, increased material costs for an oversize hook, along with the need for a larger motor to rotate the oversize hook, make this an undesirable approach. Moreover, on most devices, larger hooks cannot be retrofitted because such larger hooks are not capable of being fully retracted within the moveable carriage and may thus interfere with the carriage's normal range of motion and operation.

Accordingly, there exists a need for an improved vehicle restraint device including a rotating restraining member capable of capturing the newer and larger ICC bars, yet also capable of retracting fully within the carriage of an existing vehicle restraint device.

SUMMARY OF THE INVENTION

In accordance with an aspect of the invention, a vehicle restraint for releasably securing a parked vehicle to an adjacent structure is disclosed. The vehicle restraint comprises a carriage mountable adjacent to the structure for vertical movement relative thereto. The carriage includes a recess. The vehicle restraint also includes a restraining member pivotally mounted to the carriage. The restraining member is shiftable between a retracted position wherein the restraining member is generally disposed within the recess, and an extended position wherein the restraining member is disposed to engage a portion of the parked vehicle. The restraining member includes a base pivotally mounted to the carriage, a crown, and an offset shank interconnecting the base and the crown. The crown, the shank, and the base each have inner edges defining three sides of a substantially tetragonally shaped area sized to receive the vehicle portion.

In some embodiments, the vehicle restraint further includes a motor operatively connected to the restraining member for rotating the restraining member between the retracted and engaged positions.

In some embodiments, the crown includes an end having a barb which is adapted to frictionally engage the portion of the vehicle.

In some embodiments, the area is sized to receive a vehicle portion having a generally rectilinearly shaped cross-section.

In some embodiments, the area is sized to receive a vehicle portion having a height of at least five inches.

In some embodiments, the crown is fully disposed within the recess when the restraining member is in the retracted position.

In some embodiments, the vertex between the crown and the shank is approximately ninety degrees. In other embodiments, the vertex between the base portion and the shank is an obtuse angle. In still other embodiments, the vertex between the crown and the shank is approximately ninety degrees and the vertex between the base portion and the shank is an obtuse angle.

In accordance with another aspect of the invention, a restraining member for use with a vehicle restraint for releasably securing a parked vehicle to an adjacent structure is provided. The vehicle restraint includes a carriage mountable adjacent to the structure for vertical movement relative thereto, and a recess. The restraining member is mountable to the carriage for pivotal movement between a retracted position wherein the restraining member is substantially disposed within the recess and an extended position wherein the restraining member is disposed to engage a portion of the vehicle. The restraining member comprises a base pivotally mountable to the carriage; a crown; and a recessed shank interconnecting the base and the crown. The crown, the shank, and the base define a continuous inner edge circumscribing three sides of a substantially tetragonally shaped area.

In accordance with another aspect of the invention, a kit for modifying an existing vehicle-restraint for engaging the ICC bar of a commercial vehicle parked adjacent a structure is disclosed. The vehicle restraint has a carriage defining a recess. The carriage is mountable adjacent to the structure for vertical movement relative thereto. The kit comprises a restraining member having a base for mounting to the carriage. The restraining member is adapted for pivotal movement between a retracted position and an extended position. The restraining member is disposed to engage the ICC bar in the extended position. The restraining member includes a crown and a shank joining the crown to the base. The shank includes a recessed portion secured to the base by a projecting lug. The lug, the shank and the crown define three sides of a generally tetragonally shaped area. A portion of the area is adapted to capture a portion of the ICC bar.

In accordance with another aspect of the invention, a method for modifying an existing vehicle restraint to accommodate a larger ICC bar is provided. The vehicle restraint includes a moveable carriage having opposed spaced apart carriage plates of known dimensions defining a recess therebetween, and an existing rotating hook disposed within the recess. The method comprises the steps of: removing the existing rotating hook from its mounted position within the recess; and installing a restraining member in the recess between the carriage plates. The restraining member has a base, a crown and an offset shank joining the crown to the base. The shank, the base and the crown define three sides of an open, generally tetragonally shaped, area. A portion of the area is adapted to capture a portion of the ICC bar.

In accordance with another aspect of the invention a restraining member for use with a vehicle restraint for releasably securing a parked vehicle to an adjacent structure is disclosed. The vehicle restraint includes a carriage mountable adjacent to the structure for vertical movement relative thereto, and a recess. The restraining member is mounted to the carriage for pivotal movement between a retracted position wherein the restraining member is substantially disposed within the recess and an extended position wherein the restraining member is disposed to engage a portion of the vehicle. The restraining member comprises a base pivotally mounted to the carriage; a crown; an interconnecting shank; and three sided open capture means for capturing the vehicle portion. The open capture means is defined in part by cooperating portions of the base, the shank and the crown.

In accordance with still another aspect of the invention, a restraining member for use with a vehicle restraint for securing a parked vehicle in a position adjacent a structure is disclosed. The vehicle restraint includes a carriage mountable adjacent to the structure and is adapted for substantially vertical movement relative thereto. The carriage has a recess. The restraining member comprises a crown and a shank coupled to the crown and having a longitudinal axis. The crown and the shank together define an engagement portion adapted to receive and engage a portion of the vehicle. The restraining member further comprises a base coupled to the shank. The base is mountable the carriage by a pivot. The pivot of the base is spaced away from the longitudinal axis of the shank such that, rotation of the base about the pivot causes a rotational and translational movement of the engagement portion.

In accordance with yet another aspect of the invention, a restraining member for use with a vehicle restraint for securing a parked vehicle in a position adjacent a structure is disclosed. The vehicle restraint includes a carriage mountable adjacent to the structure and adapted for substantially vertical movement relative thereto. The carriage has a recess. The restraining member comprises a shank having a longitudinal axis; a crown coupled to a first end of the shank; and an offset arm coupled to a second end of the shank. The offset arm couples the shank to a pivot mounted to the carriage such that the longitudinal axis is displaced a distance away from the pivot.

DETAILED DESCRIPTION OF THE PREFERRED EMBODIMENTS

The embodiments chosen for description herein are not intended to limit the scope of the invention to the precise form disclosed, but rather have been described in order to best explain the principles of the invention so that others skilled in the art may follow its teachings.

Figure 2:
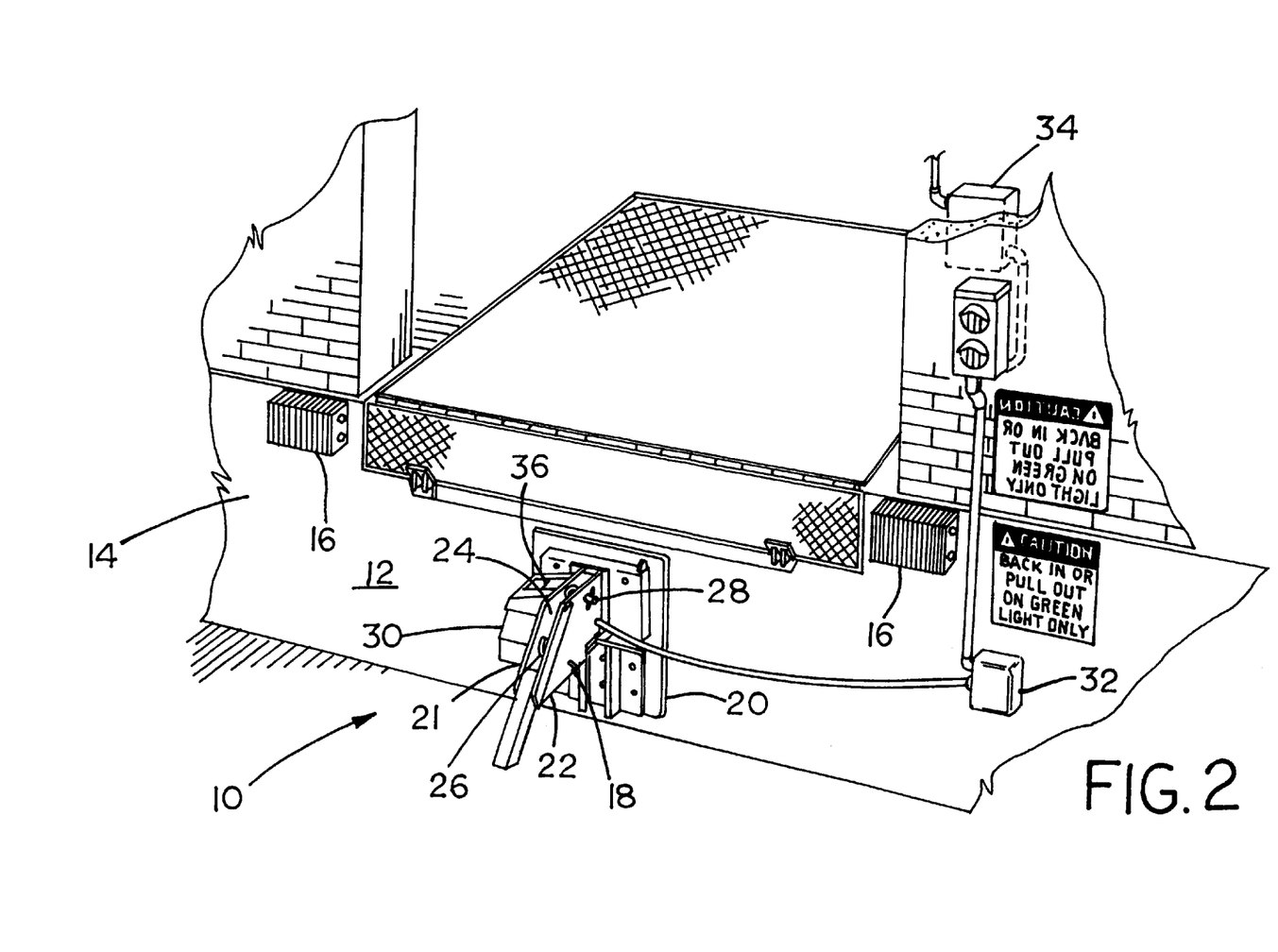
FIG. 2 is a perspective view of a typical loading dock having a vehicle restraint device constructed in accordance with the teachings of the present invention installed thereon and illustrating additional safety and operational features typically used therewith.
Figure 3:
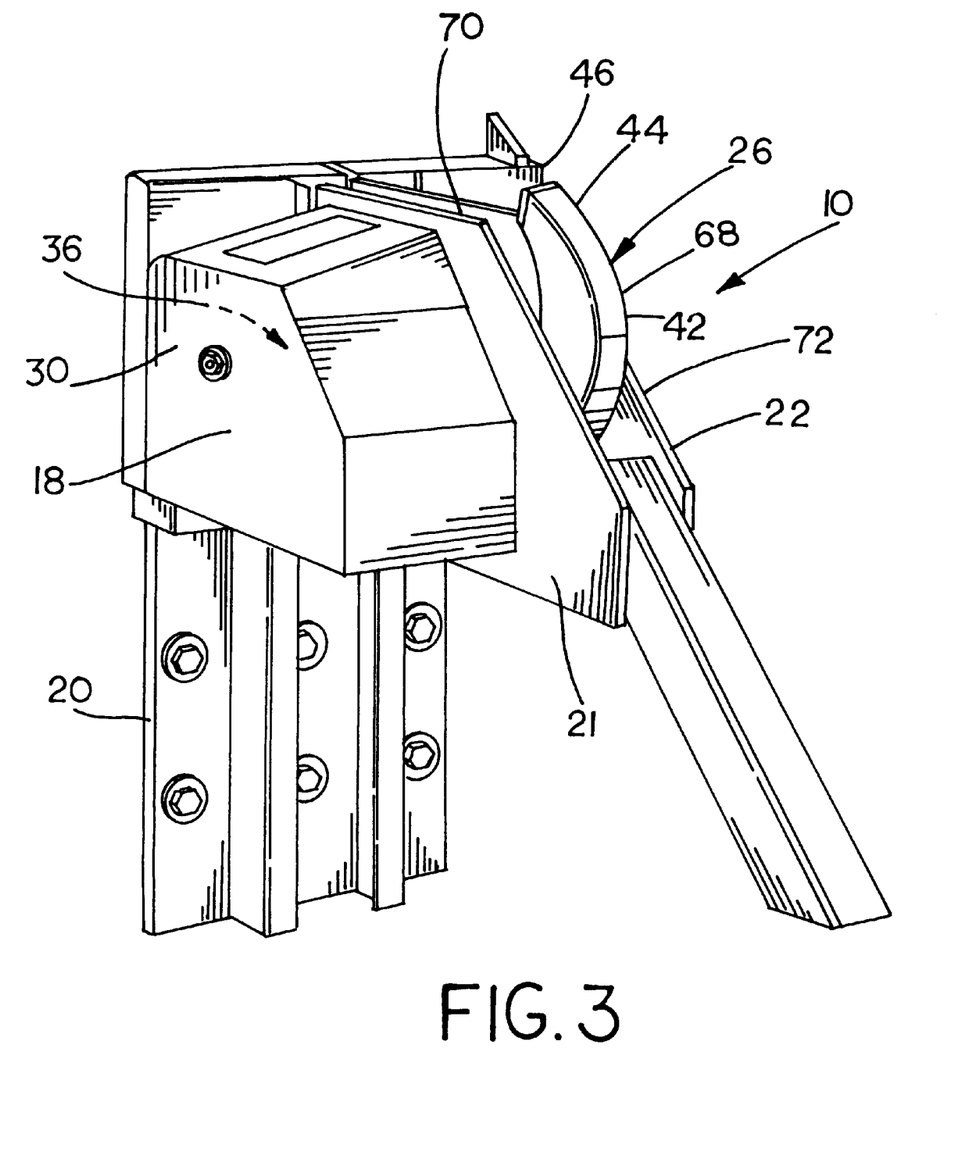
FIG. 3 is a perspective view of the vehicle restraint device of FIG. 2 showing the restraining member of the vehicle restraint in a slightly rotated position as the restraining member exits the recess within the moveable carriage.
Figure 4:
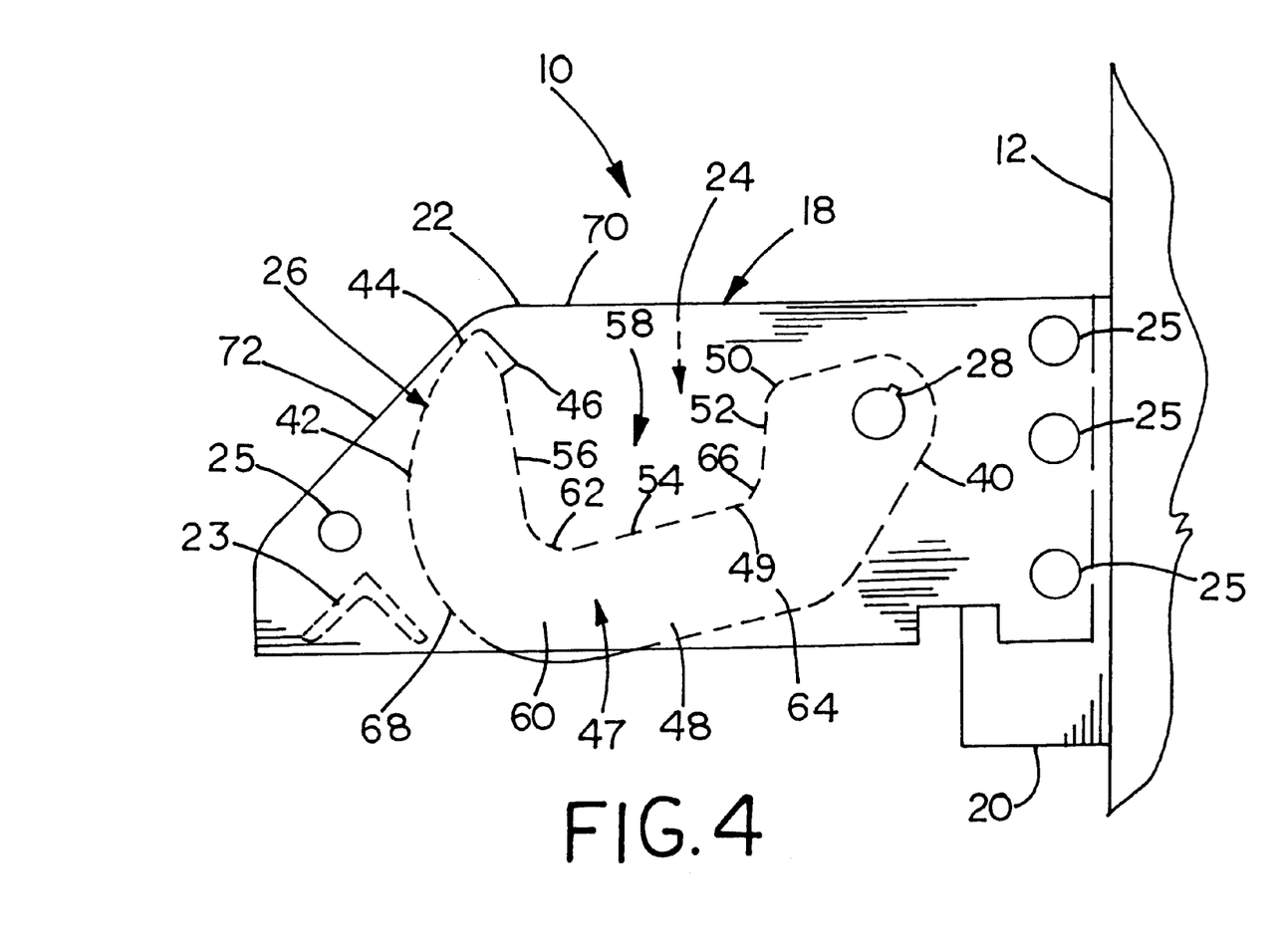
FIG. 4 is a fragmentary elevational view of the vehicle restraint of FIG. 3 showing the restraining member in a retracted position disposed within the recess of the moveable carriage.
Figure 5:
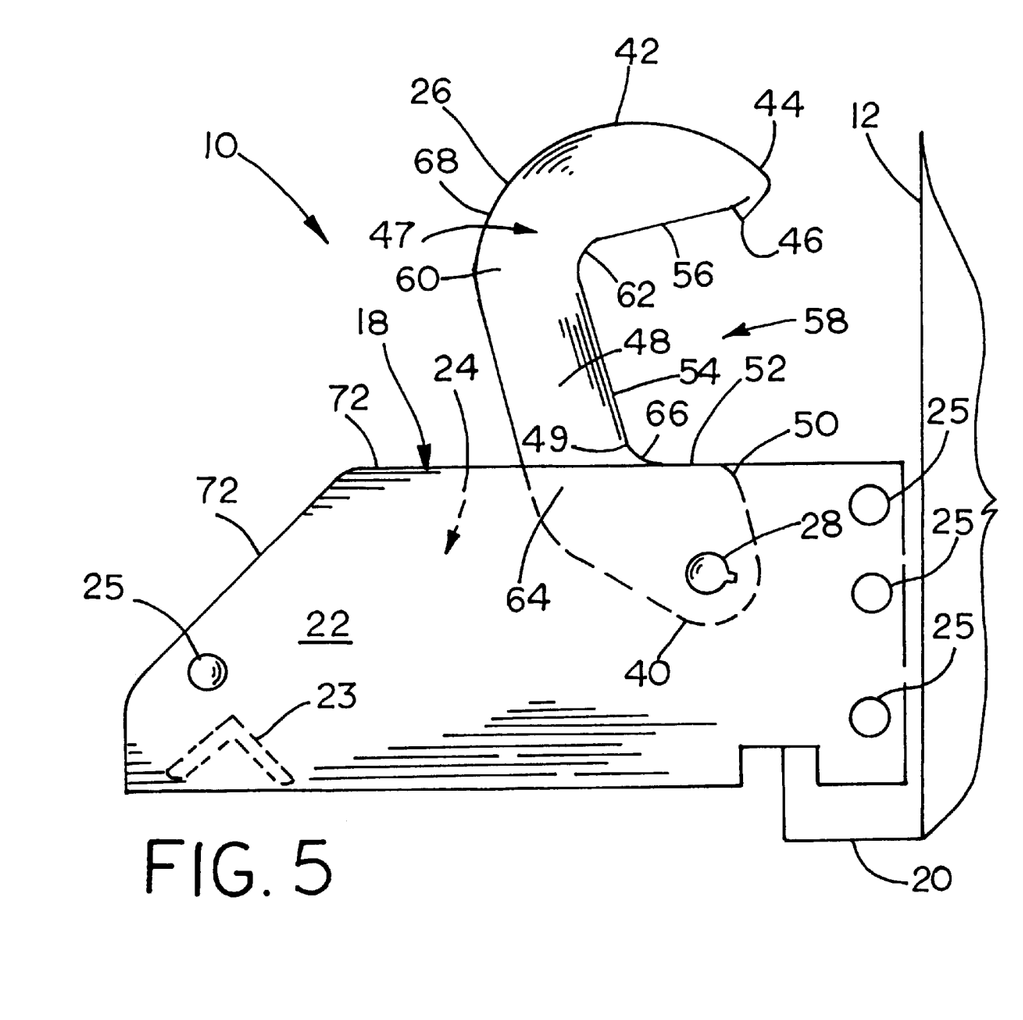
FIG. 5 is a fragmentary elevational view similar to that shown in FIG. 4 but illustrating the restraining member rotated out of the recess toward its extended or engaged position.

Referring now to the drawings, a vehicle restraint device 10 is shown attached to the wall 12 of a loading dock 14. The vehicle restraint device 10 serves to restrain a vehicle (not shown) against bumpers or other structure, such as the conventional rubber bumpers 16 mounted to the wall 12. The vehicle restraint device 10 shown in FIG. 2 includes a carriage 18 which is slidably and adjustably mountable on a mounting plate 20 for adjustable substantially vertical movement in a manner more fully described in U.S. Pat. No. 4,264,259 issued to Hipp, the disclosure of which is incorporated herein by reference. The carriage 18 includes a pair of spaced apart carriage plates 20, 22, which define therebetween a recess 24. One or more spacers 23 and/or bushings 25, lie between the adjacent plates 20, 22. A restraining member 26 constructed in accordance with the teachings of the present invention is mounted to carriage 18 by a conventional pivot 28, so that the restraining member 26 can pivot between the retracted position shown in FIG. 4 and the extended position such as is shown in FIGS. 5 through 8.

Figure 6:
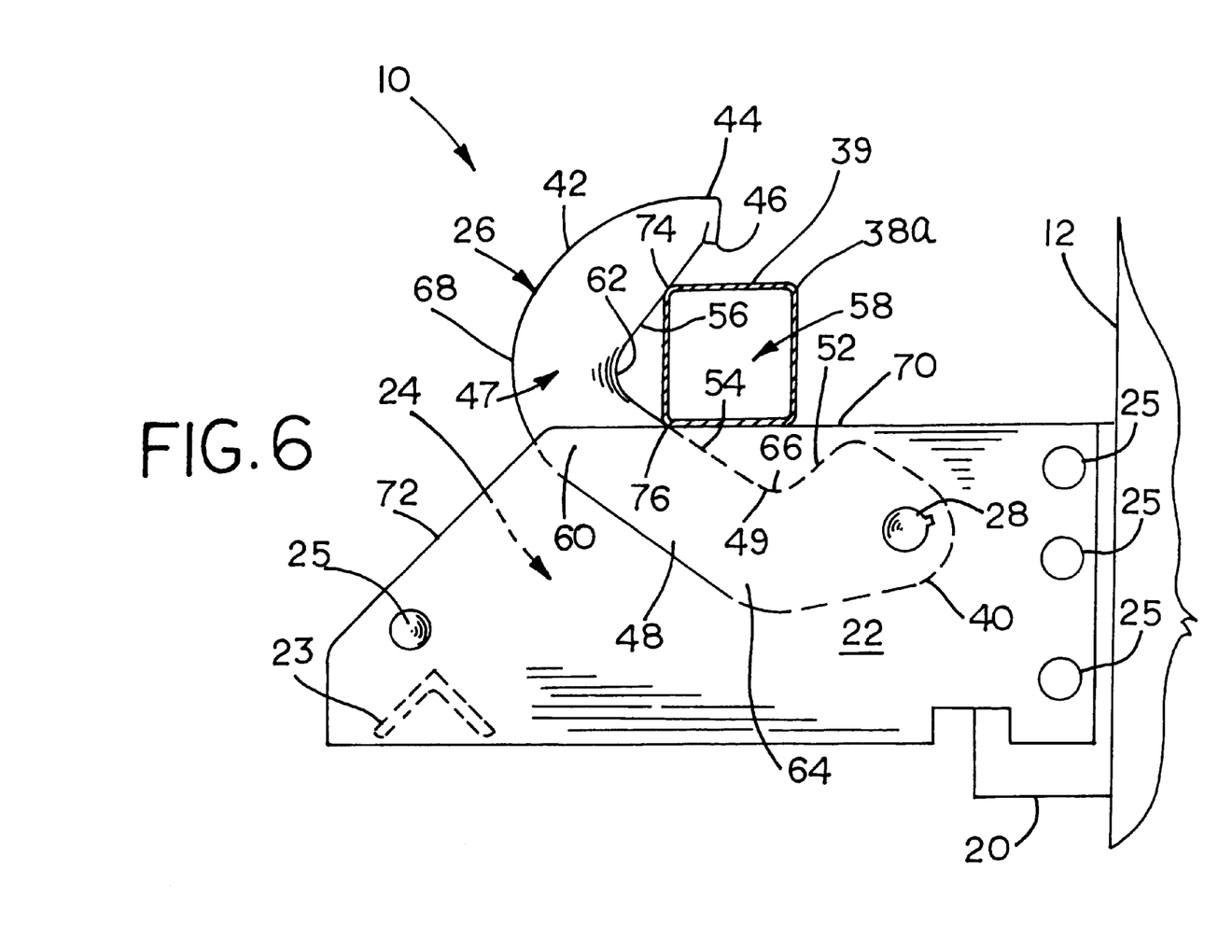
FIG. 6 is a fragmentary elevational view similar to FIGS. 4 and 5 but illustrating the restraining member in engagement with a generally square conventional ICC bar of a commercial vehicle (not shown)
Figure 7:
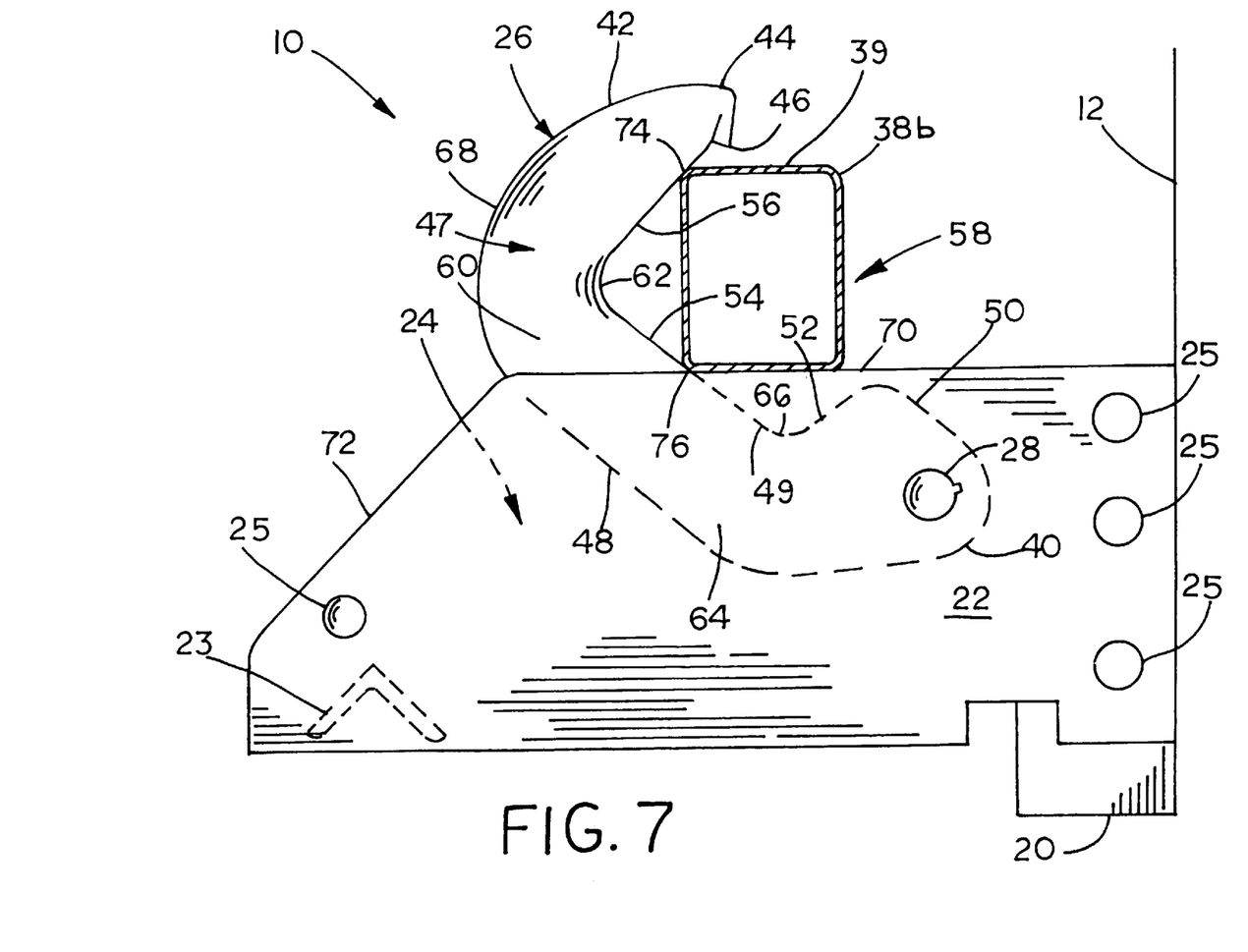
FIG. 7 is a fragmentary elevational view similar to FIGS. 4 through 6 but illustrating the restraining member in engagement with an updated rectangular ICC bar having a height greater than its width.
Figure 8:
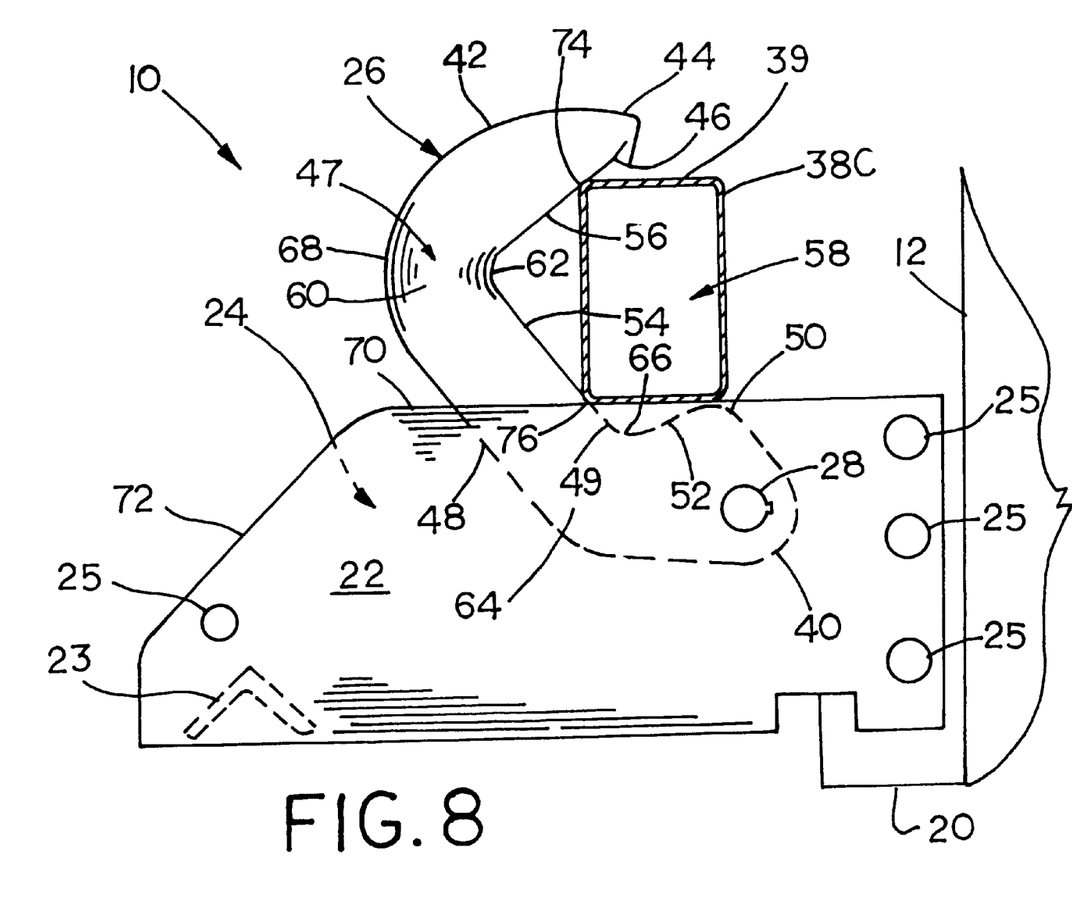
FIG. 8 is a fragmentary elevational view similar to FIG. 7, but illustrating the restraining member in engagement with a still taller updated rectangular ICC bar.

A motor drive assembly 30 is provided for rotating the restraining member 26, and is operable using a control system 32 operable, for example, from a control station 34. The motor assembly 30 may include a ratchet mechanism or slip clutch 36 of the type discussed more fully in the Hipp '259 patent, or any suitable clutch assembly that will prevent the overpivoting of the restraining member 26 in either direction or as necessary to prevent damage to the motor assembly 30 during overload conditions. Alternatively, the restraining member 26 may be rotated manually. The restraining member 26 is adapted to engage a downwardly depending safety member attached to the rear of the vehicle, typically termed an ICC bar or RIG and generally referred to by the reference numerals 38a, 38b, or 38c, depending on its size, as depicted in FIGS. 6, 7 and 8, respectively. RIGs 38a–c have a generally rectangular cross-section and a vertical dimension of approximately four, five, and six inches, respectively, although other sizes and cross-sectional shapes may be contemplated.

Referring now to FIGS. 4 through 8, the restraining member 26 includes a base 40, and a crown 42 terminating at a distal end 44 having a barb 46. An interconnecting shank 48 extends between the base 40 and the crown 42. The crown 42 and the shank 48 generally define a hook or engagement portion 47 adapted to engage the RIG 38a–38c. The shank 48 includes an offset section 49 coupled to the base 40. The base 40 includes a tab or lug 50. As will be discussed in greater detail below, upon actuation of the motor drive assembly 30, by virtue of the offset section 49 of the shank 48 the engagement portion 47 of the retaining member 26 will experience a complex motion consisting of rotation and translation.

Each of the base 40, the crown 42 and the shank 48 include an inner edge 52, 54, 56, respectively. The inner edges 52, 54, 56 cooperate to define or circumscribe a three sided, substantially tetragonally shaped, area 58. A portion of the area 58 is generally contiguous with the engagement portion 47, which is adapted to receive, engage, or otherwise trap therewithin a portion of the RIG 38a–c. The crown 42 and an outer end 60 of the shank 48 intersect at a vertex 62, which defines an angle of roughly ninety degrees. The base 40 and an inner end 64 of the shank intersect at a vertex 66, which defines an obtuse angle. The restraining member 26 includes a generally continuous outer edge 68, defined by the outer portions of each of the base 40, the shank 48, and the crown 42. The dimensions of the restraining member 26 make it possible for substantially all of the outer edge 68 of the restraining member 26 to be disposed within the recess 24 when the restraining member 26 is in the retracted position of FIG. 4. Moreover, with the restraining member 26 in the retracted position, the distal end 44 as well as the barb 46 of crown 42 preferably do not protrude past the edge 70 of the carriage 18.

In operation, as described in greater detail in the Hipp patent, the vehicle restraint device 10 is typically biased toward a predetermined rest position by one or more springs (not shown) or similar conventional means. An inclined camming portion 72 of upper edge 70 of the carriage 18 cams against a portion of the RIG 38 (either of RIGs 38a–c) of a commercial vehicle (not shown) approaching the loading dock 12, causing the moveable carriage 18 to move from its rest position to the proper position when the vehicle is parked. Upon actuation of the controls 32 (see FIG. 2) by an operator, the motor assembly 30 moves the restraining member 26 to its operative engaged position, such as that shown in FIGS. 5 through 8, wherein the restraining member 26 engages the ICC bar.

As stated above, the engagement portion 47 of the restraining member 26 both rotates and translates upon actuation of the motor drive assembly 30 due to the offset construction of the restraining member 26. This complex motion permits the engagement portion 47 of the restraining member 26 to capture the RIG 38 at two points 74 and 76 when the restraining member 26 is in the operative engaged position as shown in FIG. 6 through FIG. 8. This contact at points 74 and 76 firmly captures the RIG 38 substantially within the area 58 defined by the restraining member 26. The complex rotational and translational motion also permits the engagement portion 47 of the restraining member 26 to capture a RIG of various dimensions (as evidenced by RIGs 38a–c) without increasing the longitudinal dimension of the restraining member 26 and without increasing the outer dimensions of the carriage 18. Moreover, the complex motion of the restraining member 26 enables the restraining member 26 to engage and capture RIGs of varying sizes (e.g., either of RIGs 38a–38c) without having to remount the restraining member 26 within the carriage 18.

The barb 46 at the distal end 44 of crown 42 serves to further engage a portion of an upper surface 39 of the ICC bar 38a–c, which also serves to protect the motor assembly 30 and the clutch mechanism 36 from inadvertent damage in the event of an attempted premature departure of the vehicle away from the loading dock 12. The dimensions of the area 58 make it possible for the engagement portion 47 of the restraining member 26 to capture and engage a wide variety of sizes for the ICC bar 38, including the sizes referred to above, without having to resort to different restraining members for different vehicles, and while still being capable of being received within a carriage of conventional size using an existing pivot point.

Figure 9:
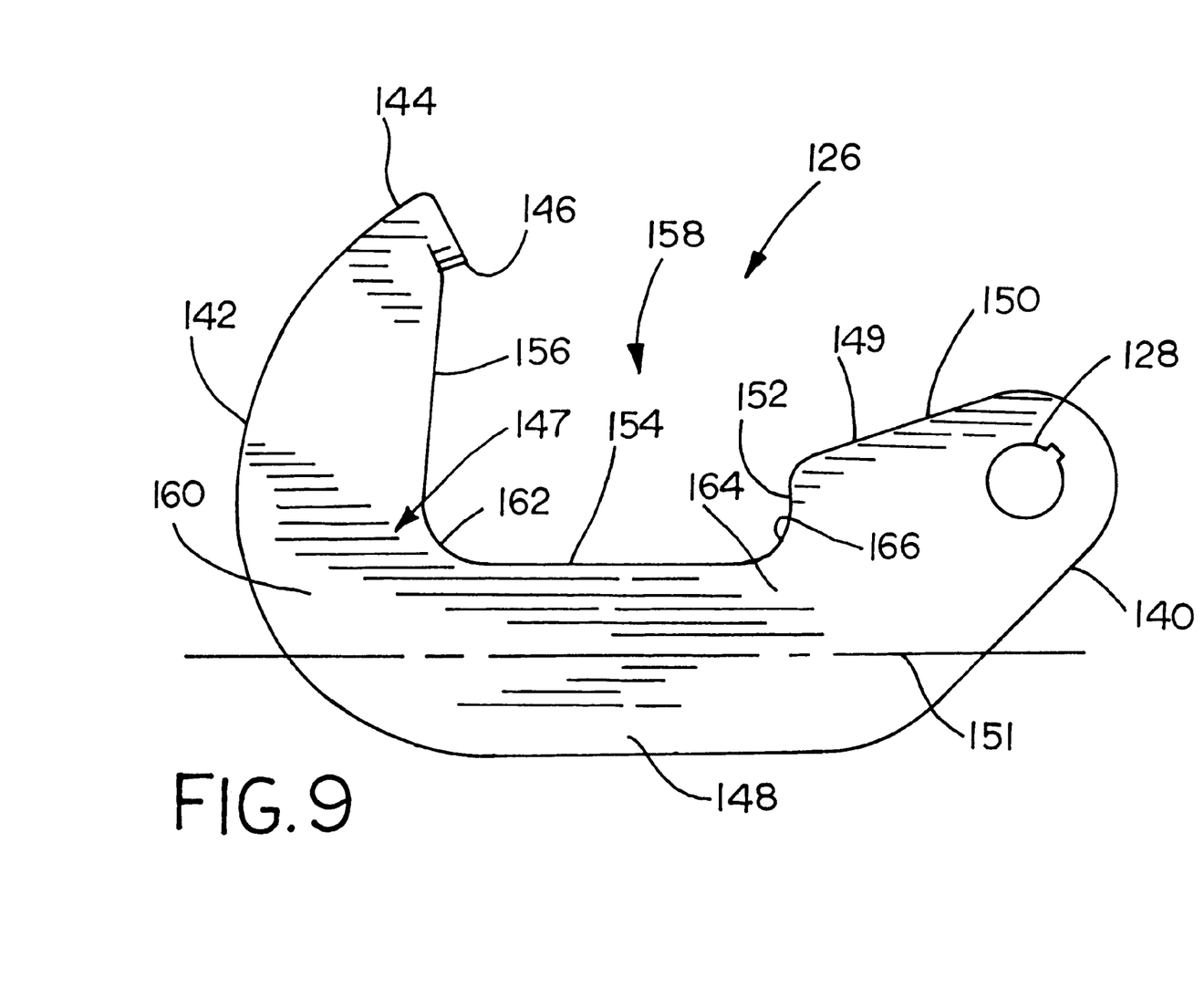
FIG. 9 is an elevational view of an alternative restraining member which is adapted for use with the vehicle restraint illustrated in FIG. 2.

Referring now to FIG. 9, an alternative restraining member is shown, which is generally referred to by the reference numeral 126. Restraining member 126 is in many respects similar to the restraining member 26 described in the embodiment of FIGS. 2 through 8. In the interests of brevity, only the differences therefrom will be described herein in detail. All like or similar elements will retain the same reference characters, but will be increased by 100.

The restraining member 126 includes a base 140 and a crown 142 terminating at a distal end 144 having a barb 146. An interconnecting shank 148 extends between the base 140 and the crown 142. The crown 142 and the shank 148 generally define a hook or engagement portion 147 adapted to engage the RIG 38a–38c. The shank 148 includes an offset section 149 which is coupled to a portion 150 of the base 140, such that the central axis 151 of the shank 148 does not intersect the pivot point 128 of the restraining member 126. Each of the base 140, the crown 142 and the shank 148 includes an inner edge 152, 154, 156, respectively. The inner edges 152, 154, 156 cooperate to define or circumscribe a three sided, substantially tetragonally shaped, area 158, which area 158 is adapted to receive a portion of the RIG (not shown) therewithin for engagement and capture by the engagement portion 147. The crown 142 and an outer end 160 of the shank 148 intersect at a vertex 162, which defines an angle measuring slightly less than ninety degrees. The base 140 includes a protruding portion 141. The base 140 and an inner end 164 of the shank 148 intersect at a vertex 166, which defines an acute angle measuring slightly less than ninety degrees. Minor angular variations at vertices 162, 166 may be contemplated, depending on the requirements of the chosen application. For a more complete disclosure of the function and operation of restraining member 126, the interested reader is referred to the foregoing text detailing the function and operation of the restraining member 26 shown in FIGS. 2 through 8.

Figure 10:
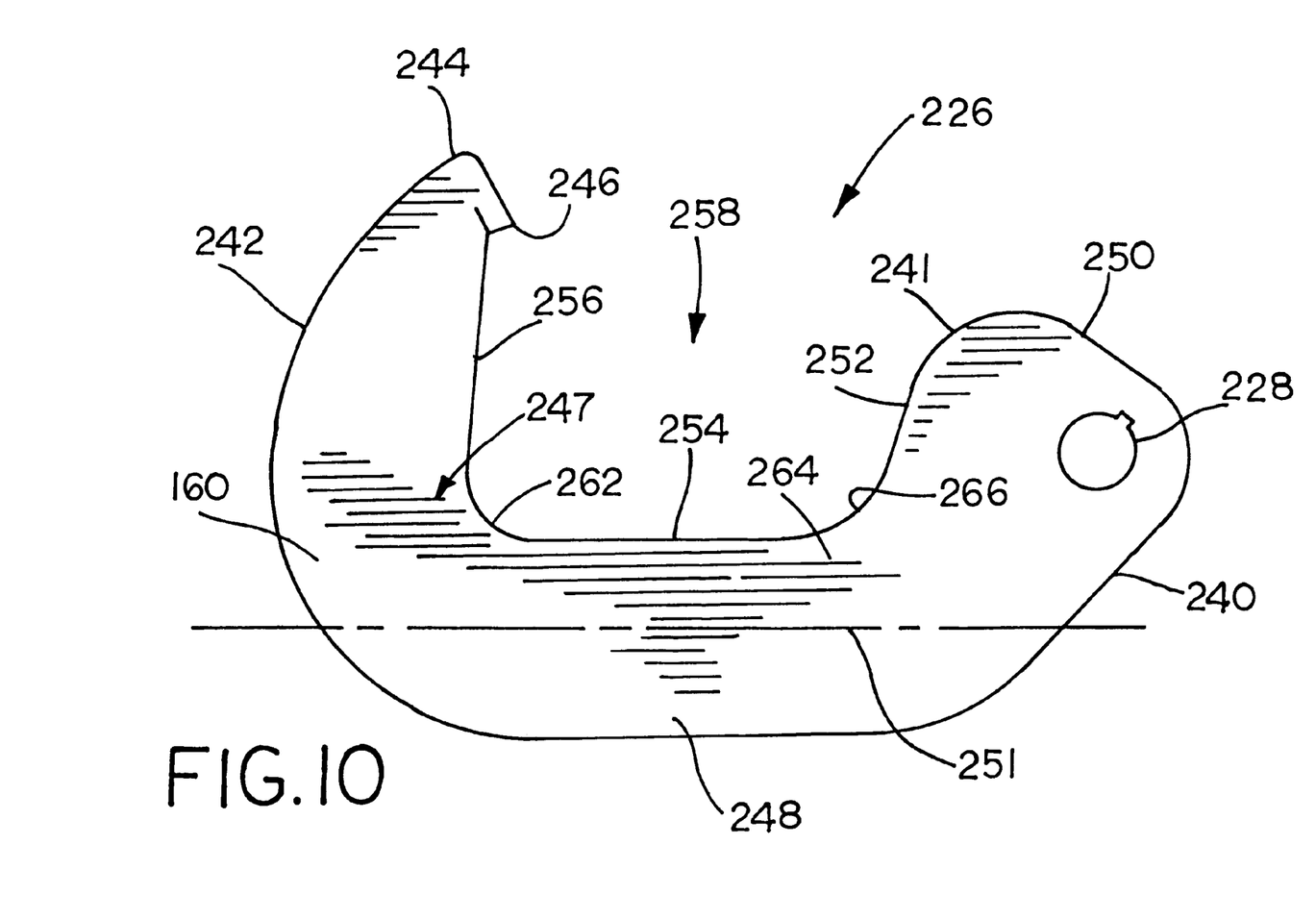
FIG. 10 is an elevational view of another alternative restraining member which is adapted for use with the vehicle restraint of FIG. 2 through FIG. 8.

Referring now to FIG. 10, another alternative restraining member is shown, which is generally referred to by the reference numeral 226. The restraining member 226 is in many respects similar to the restraining member described in the embodiment of FIGS. 2 through 8. In the interests of brevity, only the differences therefrom will be described herein in detail. All like or similar elements will retain the same reference characters, but will be increased by 200.

The restraining member 226 includes a base 240, and a crown 242 terminating at a distal end 244 having a barb 246. An interconnecting shank 248 extends between the base 240 and the crown 242. The shank 248 and the crown 242 generally define an engagement area 247. The shank 248 includes an offset section 249 which joins a portion 250 of the base 240, such that a central axis 251 of the shank 248 does not intersect a pivot point 228 of the restraining member 226. Each of the base 240, the crown 242 and the shank 248 include an inner edge 252, 254, 256, respectively. The inner edges 252, 254, 256 cooperate to define or circumscribe a three sided, substantially tetragonally shaped, area 258, two sides of which are generally contiguous with the engagement portion 247. The area 258 is adapted to receive therewithin a portion of the RIG (not shown), for securing engagement by the engagement portion 247. The crown 242 and an outer end 260 of the shank 248 intersect at a vertex 262, which defines an angle measuring slightly less than ninety degrees. The base 240 includes a generally curvilinear protruding portion 241. The base 240 and an inner end 264 of the shank 248 intersect at a vertex 266, which defines an obtuse angle measuring slightly greater than ninety degrees. Minor angular variations at vertices 262, 266 may be contemplated, depending on the requirements of the chosen application. For a more complete disclosure of the function and operation of restraining member 226, the interested reader is referred to the foregoing text detailing the function and operation of the restraining member shown in FIGS. 2 through 8.

It will be understood that the above description does not limit the invention to the precise forms disclosed. It is contemplated that various modifications and substitutions can be made without departing from the scope of the invention as defined in the following claims.

What is claimed:

1. A vehicle restraint for releasably securing a parked vehicle to an adjacent structure, comprising:
    a carriage mountable adjacent to the structure for vertical movement relative thereto, the carriage including a recess;
    a restraining member pivotally mounted to the carriage and being shiftable between a retracted position wherein the restraining member is generally disposed within the recess, and an extended position wherein the restraining member is disposed to engage a portion of the parked vehicle, the restraining member including:
    a base pivotally mounted to the carriage, a crown, and an offset shank interconnecting the base and the crown, the crown, the shank, and the base each having inner edges defining three sides of a substantially tetragonally shaped area sized to receive the vehicle portion.

2. A vehicle restraint as defined in claim 1, including a motor operatively connected to the restraining member for rotating the restraining member between the retracted and engaged positions.

3. A vehicle restraint as defined in claim 1, wherein the crown includes an end having a barb, the barb being adapted to frictionally engage the portion of the vehicle.

4. A vehicle restraint as defined in claim 1, wherein the area is sized to receive a vehicle portion having a generally rectilinearly shaped cross-section.

5. A vehicle restraint as defined in claim 1, wherein the area is sized to receive a vehicle portion having a height of at least five inches.

6. A vehicle restraint as defined in claim 1, wherein the crown is fully disposed within the recess when the restraining member is in the retracted position.

7. A vehicle restraint as defined in claim 1, wherein the vertex between the crown and the shank is approximately ninety degrees.

8. A vehicle restraint as defined in claim 1, wherein the vertex between the base portion and the shank is an obtuse angle.

9. A vehicle restraint as defined in claim 1, wherein the vertex between the crown and the shank is approximately ninety degrees and the vertex between the base portion and the shank is an obtuse angle.

10. A restraining member for use with a vehicle restraint for releasably securing a parked vehicle to an adjacent structure, the vehicle restraint including a carriage mountable adjacent to the structure for vertical movement relative thereto, the carriage having a recess, the restraining member being mountable to the carriage for pivotal movement between a retracted position wherein the restraining member is substantially disposed within the recess and an extended position wherein the restraining member is disposed to engage a portion of the vehicle, the restraining member comprising:
    a base pivotally mountable to the carriage;
    a crown; and
    a recessed shank interconnecting the base and the crown;
    the crown, the shank, and the base defining a continuous inner edge circumscribing three sides of a substantially tetragonally shaped area.

11. A restraining member as defined in claim 10, including a motor operatively connected to the restraining member for rotating the restraining member between the retracted and engaged positions.

12. A restraining member as defined in claim 10, wherein the crown includes an end having a barb, the barb being adapted to frictionally engage the vehicle portion.

13. A restraining member as defined in claim 10, wherein the area is sized to receive a vehicle portion having a generally rectilinearly shaped cross-section.

14. A restraining member as defined in claim 10, wherein the area is sized to receive a vehicle portion having a height of at least five inches.

15. A restraining member as defined in claim 10, wherein the crown is fully disposed within the recess when the restraining member is in the retracted position.

16. A restraining member as defined in claim 10, wherein the vertex between the crown and the shank is approximately ninety degrees.

17. A restraining member as defined in claim 10, wherein the vertex between the base and the shank is an obtuse angle.

18. A restraining member as defined in claim 10, wherein the vertex between the crown and the shank is approximately ninety degrees and the vertex between the base and the shank is an obtuse angle.

19. A restraining member for use with a vehicle restraint for releasably securing a parked vehicle to an adjacent structure, the vehicle restraint including a carriage mountable adjacent to the structure for vertical movement relative thereto, the carriage having a recess, the restraining member being mounted to the carriage for pivotal movement between a retracted position wherein the restraining member is substantially disposed within the recess and an extended position wherein the restraining member is disposed to engage a portion of the vehicle, the restraining member comprising:

a base pivotally mounted to the carriage;

a crown;

an interconnecting shank; and three sided open capture means for capturing the vehicle portion, the open capture means defined in part by cooperating portions of the base, the shank and the crown.

20. A restraining member for use with a vehicle restraint for securing a parked vehicle in a position adjacent a structure, the vehicle restraint including a carriage mountable adjacent to the structure and being adapted for substantially vertical movement relative thereto, the carriage having a recess, the restraining member comprising:

a crown;

a shank coupled to the crown and having a longitudinal axis, the crown and the shank together defining an engagement portion adapted to receive and engage a portion of the vehicle; and a base coupled to the shank, the base being mountable to the carriage by a pivot, the pivot of the base being spaced away from the longitudinal axis of the shank such that, rotation of the base about the pivot causes a rotational and translational movement of the engagement portion.

21. A restraining member for use with a vehicle restraint for securing a parked vehicle in a position adjacent a structure, the vehicle restraint including a carriage mountable adjacent to the structure and adapted for substantially vertical movement relative thereto, the carriage having a recess, the restraining member comprising:

a shank having a longitudinal axis;

a crown coupled to a first end of the shank; and an offset arm coupled to a second end of the shank, the offset arm coupling the shank to a pivot mounted to the carriage such that the longitudinal axis is displaced a distance away from the pivot.

\* \* \* \* \*

UNITED STATES PATENT AND TRADEMARK OFFICE
CERTIFICATE OF CORRECTION

PATENT NO.   : 6,190,109 B1
DATED        : February 20, 2001
INVENTOR(S)  : Brian D. Bender It is certified that error appears in the above-identified patent and that said Letters Patent is hereby corrected as shown below:

<u>Column 3,</u>
Line 65, please delete "mountable the" and insert -- mountable to the --.

<u>Column 10,</u>
Line 15, please delete "that," and insert -- that --.

Signed and Sealed this

Twenty-ninth Day of October, 2002

Attest:

Attesting Officer

JAMES E. ROGAN
*Director of the United States Patent and Trademark Office*